(12) United States Patent
Ronne et al.

(10) Patent No.: US 7,159,894 B2
(45) Date of Patent: Jan. 9, 2007

(54) SNAP-IN ROOF RAIL AIR BAG ASSEMBLY AND METHOD OF INSTALLATION

(75) Inventors: Jeffrey W Ronne, Shelby Township, MI (US); Jeffrey J Schultz, Swartz Creek, MI (US)

(73) Assignee: General Motors Corporation, Detroit, MI (US)

( * ) Notice: Subject to any disclaimer, the term of this patent is extended or adjusted under 35 U.S.C. 154(b) by 136 days.

(21) Appl. No.: 10/087,500

(22) Filed: Mar. 1, 2002

(65) Prior Publication Data

US 2003/0164607 A1    Sep. 4, 2003

(51) Int. Cl.
*B60R 21/213*    (2006.01)

(52) U.S. Cl. .............................. 280/728.2; 280/730.2; 411/182

(58) Field of Classification Search ............. 280/728.2, 280/730.2, 749; 411/182, 508–510, 913; 24/297, 453
See application file for complete search history.

(56) References Cited

U.S. PATENT DOCUMENTS

| | | | | |
|---|---|---|---|---|
| 3,905,570 | A * | 9/1975 | Nieuwveld ................... 248/71 |
| 4,591,203 | A * | 5/1986 | Furman ....................... 296/201 |
| 4,610,588 | A * | 9/1986 | Van Buren et al. ......... 411/173 |
| 5,458,367 | A | 10/1995 | Marts et al. ............. 280/730.1 |
| 5,533,750 | A * | 7/1996 | Karlow et al. ............ 280/730.2 |
| 5,542,691 | A * | 8/1996 | Marjanski et al. ........ 280/728.2 |
| 5,632,584 | A * | 5/1997 | Acevedo .................... 411/182 |
| 5,765,862 | A * | 6/1998 | Bentley .................... 280/728.3 |
| 5,791,683 | A * | 8/1998 | Shibata et al. ........... 280/730.2 |
| 5,803,486 | A | 9/1998 | Spencer et al. .......... 280/728.2 |
| 5,988,735 | A | 11/1999 | Muller ....................... 296/214 |
| 6,036,223 | A * | 3/2000 | Worrell et al. .............. 280/731 |
| 6,070,902 | A * | 6/2000 | Kowalski et al. ......... 280/730.2 |
| 6,082,761 | A | 7/2000 | Kato et al. ............... 280/730.2 |
| 6,095,734 | A * | 8/2000 | Postadan et al. ............ 411/182 |
| 6,145,870 | A * | 11/2000 | Devane et al. ........... 280/728.2 |
| 6,168,186 | B1 * | 1/2001 | Welch et al. ............. 280/728.2 |
| 6,485,048 | B1 * | 11/2002 | Tajima et al. ............ 280/728.2 |
| 6,502,854 | B1 * | 1/2003 | Mueller .................... 280/730.2 |
| 6,540,251 | B1 * | 4/2003 | LeVey et al. ............. 280/728.2 |
| 6,588,796 | B1 * | 7/2003 | Webber et al. .............. 280/737 |
| 6,726,418 | B1 * | 4/2004 | Dickinson et al. .......... 411/182 |
| 2001/0046426 | A1 * | 11/2001 | Lubera et al. .............. 411/182 |
| 2003/0015859 | A1 * | 1/2003 | Nakazawa ................ 280/728.2 |

* cited by examiner

*Primary Examiner*—Paul N. Dickson
*Assistant Examiner*—Laura B. Rosenberg
(74) *Attorney, Agent, or Firm*—Laura C. Hargitt

(57) ABSTRACT

A roof rail air bag assembly includes an air bag module having an air bag inflator and an air bag with a plurality of cushion retention tabs. Also included in the assembly are an inflator bracket and a plurality of snap-in clips. The bracket is attached to the air bag inflator; the snap-in clips are attached to the cushion retention tabs and to the bracket with threaded fasteners. The air bag assembly is positioned within the vehicle by an operator standing outside the vehicle, and each of the snap-in clips are inserted into openings in the vehicle roof rail. Removing the air bag module for service is accomplished by removing each of the threaded fasteners while the snap-in clips remain permanently attached to the vehicle roof rail.

6 Claims, 3 Drawing Sheets

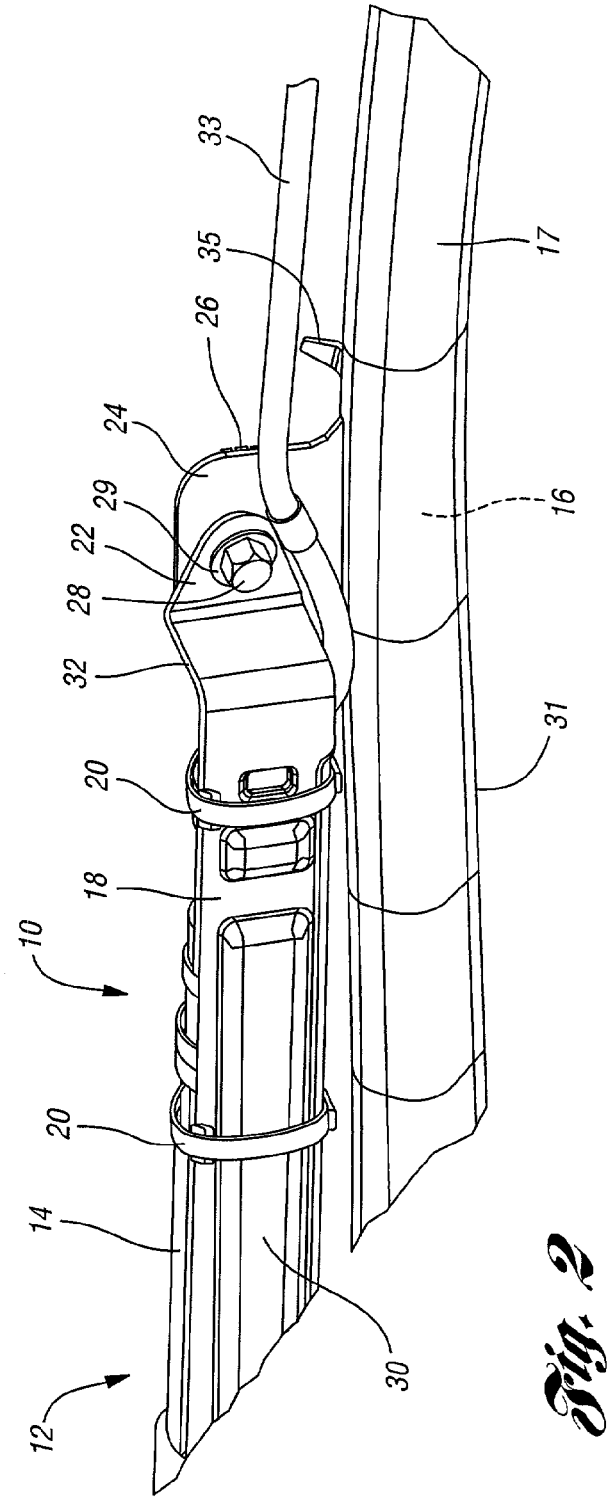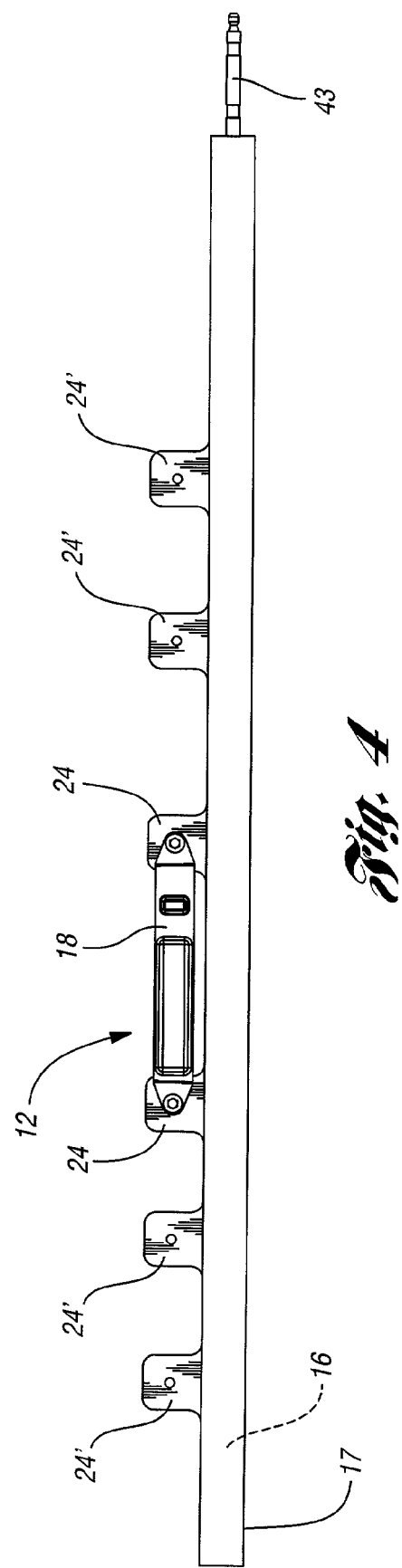

SNAP-IN ROOF RAIL AIR BAG ASSEMBLY AND METHOD OF INSTALLATION

BACKGROUND OF THE INVENTION

1. Field of the Invention

The present invention relates to a snap-in roof rail air bag assembly for a vehicle and a method of attaching same.

2. Background Art

Use of roof rail air bag assemblies, used primarily as a means to protect vehicle passengers, is well known. Likewise, methods of attaching these air bag assemblies are also well known. Despite the widespread use of these air bag assemblies, and despite the many different means by which they are attached to the interior of a vehicle, typical attachment mechanisms have a number of inherent limitations.

One limitation is the necessity of having separate fasteners to attach the air bag assembly to the vehicle. U.S. Pat. No. 6,082,761 issued to Kato et al. on Jul. 4, 2000, discloses an air bag assembly containing a bracket with mounting holes. Separate fasteners, either threaded or push-in, are inserted through the mounting holes and then secured to the vehicle. This type of design increases the cost of the air bag assembly by requiring additional parts—i.e., fasteners—as well as the additional labor required to install the fasteners and mount the assembly to the vehicle from the side or overhead.

Stripped threads is a problem often encountered when large air bags are installed into the vehicle using threaded attachments. Proper alignment of the fasteners with the threaded holes in the vehicle frame is difficult for an operator who is trying to maneuver the large air bag assembly. Thus, misalignment is common and the likely result is stripped threads or cross-threaded attachments. Weld nuts or "u-nuts" are sometimes used as an alternative to threaded fasteners; however, these designs do not eliminate all of the problems associated with using separate fasteners in the installation process.

One attempt to overcome these problems is disclosed in U.S. Pat. No. 5,988,735 issued to Muller on Nov. 23, 1999. Muller discloses a vehicle head liner into which air bag assemblies are mounted. This eliminates the need to separately mount the air bag assemblies onto the vehicle. With this design, the air bags are installed into the vehicle when the head liner is installed, thus eliminating the need to use separate fasteners. A disadvantage of this design is that the installation of the head liner is made more difficult because of the presence of the air bag assemblies. Moreover, this design, as well as other prior art designs, all have another inherent limitation: overhead installation. Each of these designs requires operators to work with air bag assemblies over their heads, which increases overall cycle time.

Accordingly, it is desirable to provide an air bag assembly which overcomes the above referenced short comings of prior art air bag assemblies, by eliminating the need for external fasteners as well as the need for the operator to enter the vehicle or work overhead.

SUMMARY OF THE INVENTION

The present invention provides an air bag assembly that can be attached to the roof rail of a vehicle without the use of external fasteners and while the operator is standing outside the vehicle. The air bag assembly comprises an air bag module, an inflator bracket, and a plurality of snap-in clips. The air bag module itself includes an air bag inflator and an air bag that has a plurality of cushion retention tabs.

One advantage of the present invention is that it eliminates the need for installation tools at the assembly plant. The feature that provides for "hand-only" installation is the snap-in clip, which is a type of modified garnish molding clip. A clip is attached to each cushion retention tab and to the inflator bracket with a removable serviceability attachment feature. Typically, this is a threaded fastener, though use of any removable attachment feature is contemplated.

The attachment of the clips takes place before the installation operation, so that the installation operator receives the assembly as a single, complete unit. The operator first inserts the assembly into the vehicle—e.g., through an open window or through an opening in the vehicle roof—and then snaps each of the snap-in clips into openings in the roof rail. This eliminates the need for separate fasteners and tools during the installation operation; thus, cycle time is decreased which results in an increase in production and a reduction in labor costs.

Another benefit is realized in the area of quality. Installation of air bag assemblies by an operator working overhead, may result in cross-threaded attachments. This is a result of the difficulty in properly aligning a large air bag assembly while working in an overhead position. If the mounting holes in the bracket are not properly aligned with the threaded holes in the vehicle frame, cross-threading of the fastener may result. The present invention eliminates this problem by having snap-in clips attached to the air bag module before it reaches the installation step. Fasteners are threaded into the snap-in clips when the air bag module is in a more accessible position—i.e., not above the operator's head. Therefore, the problems of misalignment, stripped threads and cross-threading are virtually eliminated.

In a preferred embodiment, the air bag module containing an air bag and an air bag inflator, is attached to the inflator bracket with strap clamps. The clamps wrap around the cylindrical inflator and the bracket, thereby securing them together. The air bag is folded inside an air bag cover, which has a tear seam along one edge to allow the air bag to fully inflate upon deployment. Extending out through openings in the air bag cover are the cushion retention tabs. The cushion retention tabs are integrally attached to the air bag, and are used to help attach the air bag to the roof rail. A threaded fastener is inserted through each cushion retention tab and then threaded into a snap-in clip, thereby securing the cushion retention tab to the snap-in clip.

When attaching the snap-in clips to the inflator bracket, a threaded fastener is inserted through an opening in the bracket and then through a cushion retention tab prior to being threaded into a snap-in clip. This captures the cushion retention tab between the bracket and the snap-in clip, further securing the air bag module to the bracket. The completed assembly is received by the installation operator, who inserts each of the snap-in clips into openings in the vehicle roof rail. If the air bag module ever needs service, the threaded fasteners are simply removed from each snap-in clip. This allows the entire air bag module to be removed, while each of the snap-in clips remains firmly seated inside the vehicle roof rail.

Accordingly, one aspect of the invention provides an air bag assembly that can be installed in a vehicle roof rail, without the need for the installation operator to work overhead or use loose fasteners to install the assembly, thereby making the installation easier and faster, and increasing quality by eliminating the problem of stripped threads and cross-threaded connections which result from the difficulty in aligning a large air bag assembly.

Another aspect of the present invention provides an air bag assembly that can be installed in a vehicle roof rail by an operator standing outside the vehicle, whereby the operator snaps the assembly into openings in the vehicle roof rail using snap-in clips and no installation tools, thus incurring savings in both labor and tooling.

A further aspect of the invention provides a snap-in roof rail air bag assembly for a vehicle with a roof rail, that comprises an air bag module having an air bag inflator and an air bag with at least one cushion retention tab. A snap-in clip, permanently attachable to the roof rail, is selectively attachable to the at least one cushion retention tab with a removable serviceability attachment feature. The removable serviceability attachment feature allows the air bag module to be selectively detached from the snap-in clip for service.

Another aspect of the invention is an improved method of installing an air bag module having an air bag inflator and an air bag with at least one cushion retention tab in a vehicle having a roof rail. The method comprises attaching a snap-in clip to the at least one cushion retention tab with a removable serviceability attachment feature and installing the air bag module in the vehicle by inserting the clip into the roof rail.

A further aspect of the invention provides in combination with a vehicle having a roof rail, a roof rail air bag assembly adapted for snap-in installation in the roof rail from outside the vehicle. The roof rail air bag assembly comprises an air bag module including an air bag inflator and an air bag with at least one cushion retention tab. A snap-in clip, permanently attachable to the roof rail, is selectively attachable to the at least one cushion retention tab with a removable serviceability attachment feature. The removable serviceability attachment feature allows the air bag module to be selectively detached from the snap-in clip for removal of the air bag module for service.

The above object and other objects, features, and advantages of the present invention are readily apparent from the following detailed description of the best modes for carrying out the invention when taken in connection with the accompanying drawings.

BRIEF DESCRIPTION OF THE DRAWINGS

FIG. 2 is a fragmentary perspective view of the air bag assembly showing a portion of the bracket attached to the inflator and the air bag, and showing a portion of a wiring harness;

FIG. 4 is an illustrative view of the air bag module and inflator bracket in the assembly build position with the snap-in clips and wiring harness removed for clarity.

DETAILED DESCRIPTION OF THE PREFERRED EMBODIMENTS

Figure 1:
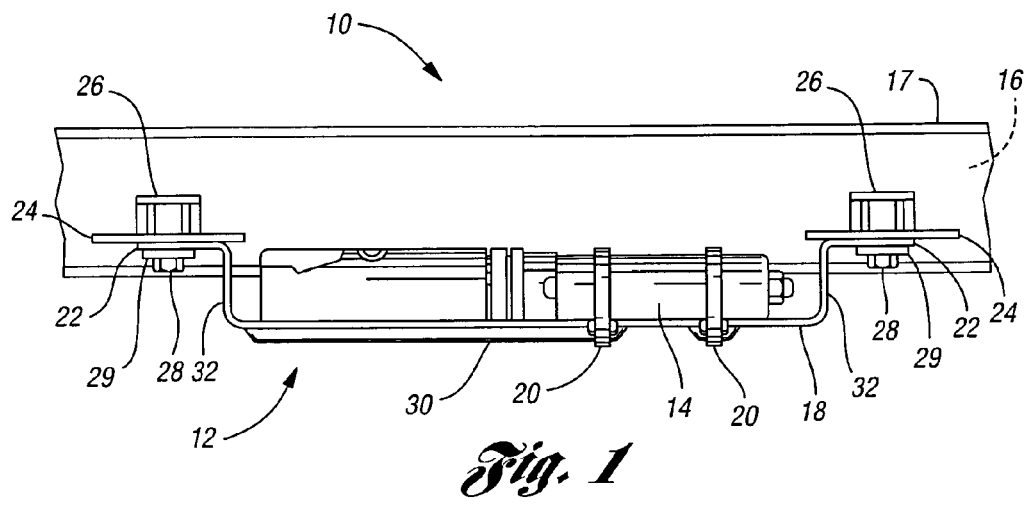
FIG. 1 is a fragmentary plan view of a snap-in roof rail air bag assembly in accordance with the present invention, showing an air bag inflator clamped to an inflator bracket which is secured to two snap-in clips with threaded fasteners.

FIG. 1 shows a fragmentary plan view of a snap-in roof rail air bag assembly 10 in accordance with the present invention. An air bag module 12 includes an air bag inflator 14 and an air bag 16, shown in FIG. 3, which is contained within an air bag cover 17. The air bag module 12 is attached to an inflator bracket 18 with strap clamps 20, which wrap around the outside of the air bag inflator 14 and the bracket 18, thereby securing the bracket 18 to the inflator 14. The bracket 18 is also attached to the air bag 16 at mounting tabs 22, see also FIG. 2. The air bag 16 has a plurality of cushion retention tabs 24 and 24', see FIG. 4. The two cushion retention tabs 24, shown in FIG. 1, are captured between the mounting tabs 22 and snap-in clips 26 to further secure the air bag module to the bracket 18. Removable serviceability attachment features 28 are inserted through washers 29, then through holes in each mounting tab 22 and each cushion retention tab 24, and then threaded into the snap-in clips 26. Though the use of any removable serviceability attachment feature is contemplated, threaded fasteners are used in this embodiment. The use of the threaded fasteners 28 allows the cushion retention tabs 24 to be securely captured between the mounting tabs 22 and the snap-in clips 26, while at the same time it allows for easy removal of the air bag module 12 if service is required.

Turning to FIG. 2, the attachment of the air bag module 12 to the inflator bracket 18 is seen in greater detail. The inflator 14 is located behind an inflator support portion 30 of the inflator bracket 18. The strap clamps 20 secure the inflator 14 to the inflator support portion 30. An attachment portion 32 includes the mounting tab 22 to facilitate attachment of the bracket 18 to the cushion retention tab 24 and the snap-in clip 26. It is important to note that the inflator 14 can be installed in various locations throughout the vehicle, such as in a B-pillar, which may not require use of the bracket 18. Each of the cushion retention tabs 24, 24', see also FIG. 4, are attached to the air bag 16, which is contained within an air bag cover 17. The air bag cover 17 has a tear seam 31 along one edge to allow the air bag to fully inflate upon deployment.

Also seen in FIG. 2 is part of a wiring harness 33 and an anti-sag attachment 35. The anti-sag attachment is a plastic fastener that is used with other anti-sag attachments (not shown) to keep the air bag 16 properly positioned under the vehicle roof rail. The anti-sag attachments do not bear the weight of the air bag 16, but rather keep it from sagging into the headliner.

Figure 3:
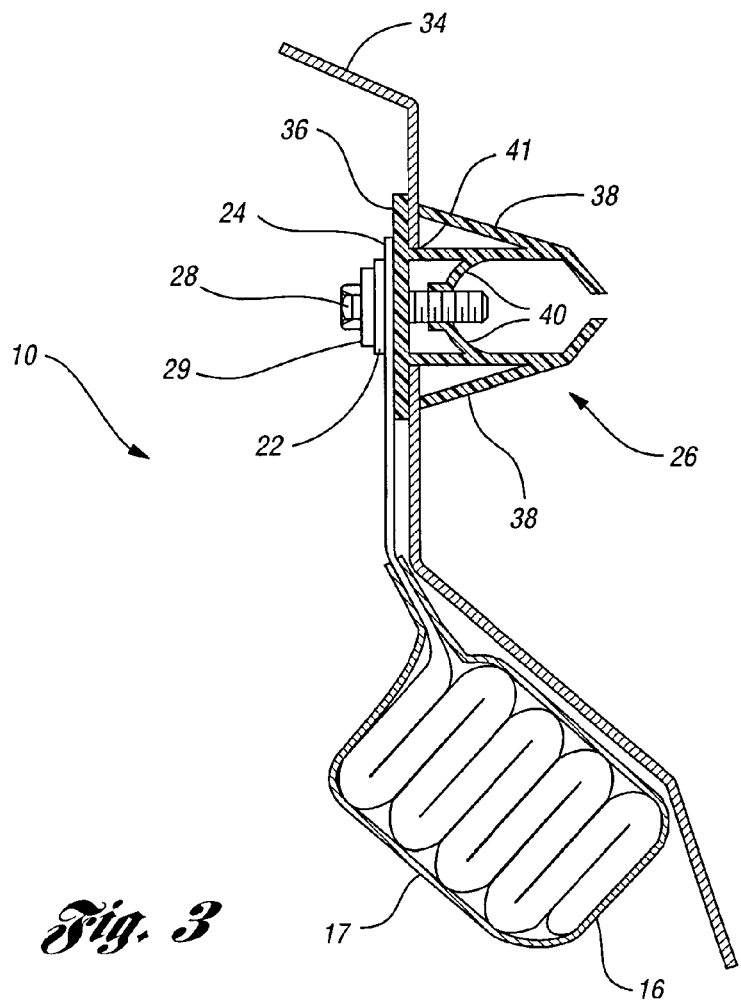
FIG. 3 is a partially schematic sectional side view of the snap-in roof rail air bag assembly attached to a vehicle roof rail, taken along line 3-3 in FIG. 5.
Figure 5:
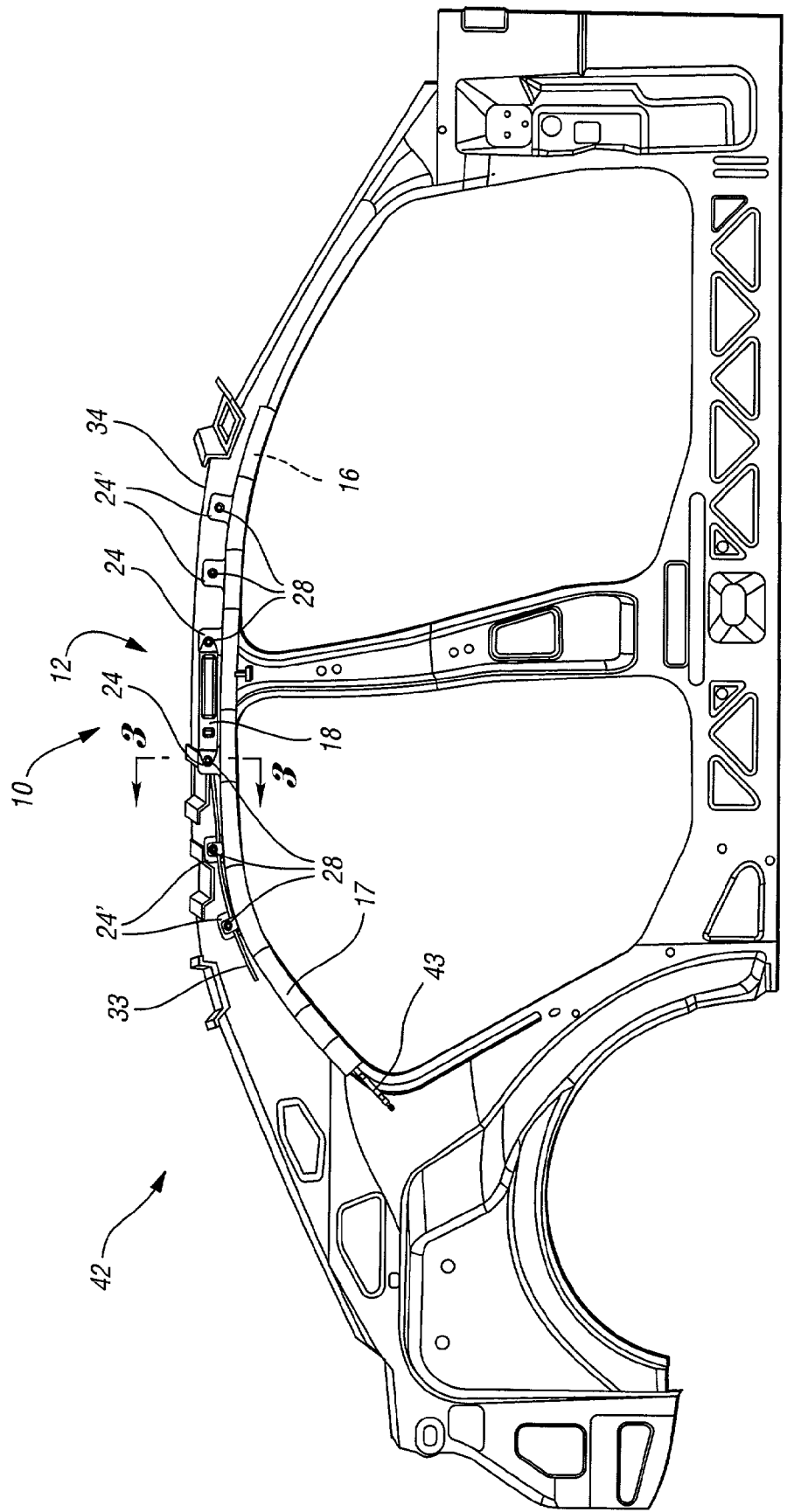
FIG. 5 shows the interior of a driver's or left side frame in a vehicle, having a left-side snap-in roof rail air bag assembly installed.

FIG. 3 shows a partially schematic sectional side view of the snap-in roof rail air bag assembly 10 attached to the driver's side roof rail 34 of a vehicle, as shown in FIG. 5. The snap-in clip 26 includes a flange portion 36, locking portions 38, and fastening portions 40. An installation operator receives the snap-in roof rail air bag assembly 10 as a complete unit. That is, the assembly shown in FIG. 1 is assembled at a supplier's facility prior to shipment to the vehicle assembly plant. Snap-in clips 26 are also attached to the remaining cushion retention tabs 24', shown in FIGS. 4 and 5, using the threaded fasteners 28 and washers 29. Therefore, to install the roof rail air bag assembly 10 as shown in FIG. 3, the installation operator need only insert each snap-in clip 26 into a respective opening 41 in the vehicle roof rail 34, such that the flange portion 36 abuts the roof rail 34, and the locking portions 38 move into position on the inside of the roof rail 34 to securely attach the assembly 10 to the roof rail 34.

The snap-in clips 26 are typically made from a spring steel material which is stamped in a progressive die and then heat treated. This allows the snap-in clips 26 to be strong enough to securely attach the air bag assembly 10 to the vehicle roof rail 34, and at the same time flexible enough so that the locking portions 38 will slide through the opening 41 in the roof rail 34 and then spring outward on the inside of the roof rail 34 to secure the entire assembly 10 into place. After the assembly 10 is installed into the vehicle roof rail 34, the air bag 16, inside the air bag cover 17, remains in position underneath the roof rail 34.

FIG. 4 shows an illustrative view of the air bag module 12 and the inflator bracket 18 in the assembly build position. A plurality of cushion retention tabs 24, 24' extend along the length of the air bag 16. Two of the cushion retention tabs 24 are attached to the inflator bracket 18. Though not shown in this view, each of the cushion retention tabs 24, 24' will be attached to a snap-in clip 26 with a threaded fastener 28 and a washer 29. This allows the assembly 10 to be inserted into multiple openings, such as 41 in FIG. 3, along the length of the roof rail 34. At one end of the air bag 16 is an electrical connector 43; it is shown detached from the wiring harness for clarity.

The attachment of the entire assembly 10 to the interior of a driver's side vehicle frame 42 is shown in FIG. 5. The air bag assembly 10 is installed in the roof rail 34 via the snap-in clips 26, not visible in this view, at each of the cushion retention tabs 24, 24'. The cushion retention tabs 24, 24' are securely fastened to the snap-in clips with the threaded fasteners 28. If the air bag module 12 needs service, a technician merely removes the threaded fasteners 28 and the entire module 12 is detachable from the roof rail 34 of the frame 42 of the vehicle. Returning to FIG. 3, it is seen that the snap-in clips 26 remain secured to the vehicle roof rail 34 even after the air bag assembly 10 is removed. The flange portion 36 and the locking portions 38 of the snap-in clips 26 effectively trap a portion of the roof rail 34 between them, thereby ensuring that the snap-in clips 26 will remain firmly attached to the roof rail 34. It is worth noting that the passenger's side of the vehicle contains a mirror image of the assembly 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A snap-in roof rail air bag assembly for a vehicle having a roof rail, comprising:

an air bag module including an air bag inflator and an air bag with at least one cushion retention tab;

a snap-in clip permanently attachable to the roof rail and selectively attachable to the at least one cushion retention tab, said snap-in clip including a fastening portion;

a removable serviceability attachment feature for attaching the air bag module at the at least one cushion retention tab to the snap-in clip by fastening said serviceability attachment feature to said fastening portion of said snap-in clip, and for selectively detaching the air bag module from the snap-in clip for removal of the air bag module for service by removing said serviceability attachment feature from said fastening portion of said snap-in clip; and an inflator bracket having an inflator support portion supporting the air bag inflator and an attachment portion having a mounting tab for receiving the serviceability attachment feature, and for capturing the at least one cushion retention tab between the inflator bracket and the snap-in clip.

2. The roof rail air bag assembly of claim 1, further comprising an air bag cover protectingly covering the air bag, and having a tear seam along one edge.

3. The roof rail air bag assembly of claim 2, wherein the cushion retention tab extends through the air bag cover, for at least partially supporting the air bag and the air bag cover.

4. The roof rail air bag assembly of claim 3, wherein the mounting tab of the inflator bracket is attached to the snap-in clip with the serviceability attachment feature.

5. A method of installing an air bag module having an air bag inflator and an air bag with at least one cushion retention tab in a vehicle having a roof rail, comprising:

attaching the air bag module to an inflator bracket having an inflator support portion and an attachment portion with a mounting tab;

attaching a snap-in clip having a fastening portion to the at least one cushion retention tab with a removable serviceability attachment feature by fastening said removable serviceability attachment feature to said fastening portion;

capturing the cushion retention tab between the mounting tab and the snap-in clip prior to attaching the snap-in clip to the cushion retention tab; and installing the air bag module in the vehicle by inserting the snap-in clip into the roof rail.

6. In combination with a vehicle having a roof rail, a roof rail air bag assembly adapted for snap-in installation in the roof rail of the vehicle, from outside the vehicle, the air bag assembly comprising:

an air bag module including an air bag inflator and an air bag with at least one cushion retention tab;

a snap-in clip permanently attachable to the roof rail and selectively attachable to the at least one cushion retention tab said snap-in clip including a fastening portion;

a removable serviceability attachment feature for attaching the air bag module at the at least one cushion retention tab to the snap-in clip by fastening said serviceability attachment feature to said fastening portion of said snap-in clip, and for selectively detaching the air bag module from the snap-in clip for removal of the air baa module for service by removing said serviceability attachment feature from said fastening portion of said snap-in clip; and an inflator bracket having an inflator support portion connected to the air bag inflator and an attachment portion having a mounting tab for receiving the serviceability attachment feature, and for capturing the at least one cushion retention tab between the inflator bracket and the snap-in clip.

\* \* \* \* \*